Oct. 19, 1937.  A. M. STANLEY  2,096,366
VEHICLE WHEEL
Original Filed Feb. 19, 1931

Witness
Paul F. Bryant

Inventor
Arthur M. Stanley
by his attorneys
Van Everen Fish Hildreth & Cary

Patented Oct. 19, 1937

2,096,366

UNITED STATES PATENT OFFICE 2,096,366

VEHICLE WHEEL

Arthur M. Stanley, Lynn, Mass., assignor to Stanley Engineering, Inc., Boston, Mass., a corporation of Massachusetts Application February 19, 1931, Serial No. 516,869
Renewed January 17, 1935

2 Claims. (Cl. 301—6)

The present invention relates to improvements in metallic vehicle wheels, and more particularly to improvements in welded metallic wheels having the general appearance of the usual spoke wheel.

One object of the invention is to provide a wheel of simple and rugged construction which will withstand the usage to which it is normally subjected, and which may be readily removed from its mount and replaced by a spare. A further object of the invention is to provide an improved type of rim constructcion forming a part of the wheel, which permits and facilitates the removal of a deflated tire and its replacement by a fresh tire.

With these and other objects in view, the various features of the invention consist in certain novel features of construction, combinations and arrangements of parts hereinafter described and claimed, the advantages of which will be obvious to those skilled in the art from the following description.

Figure 1:
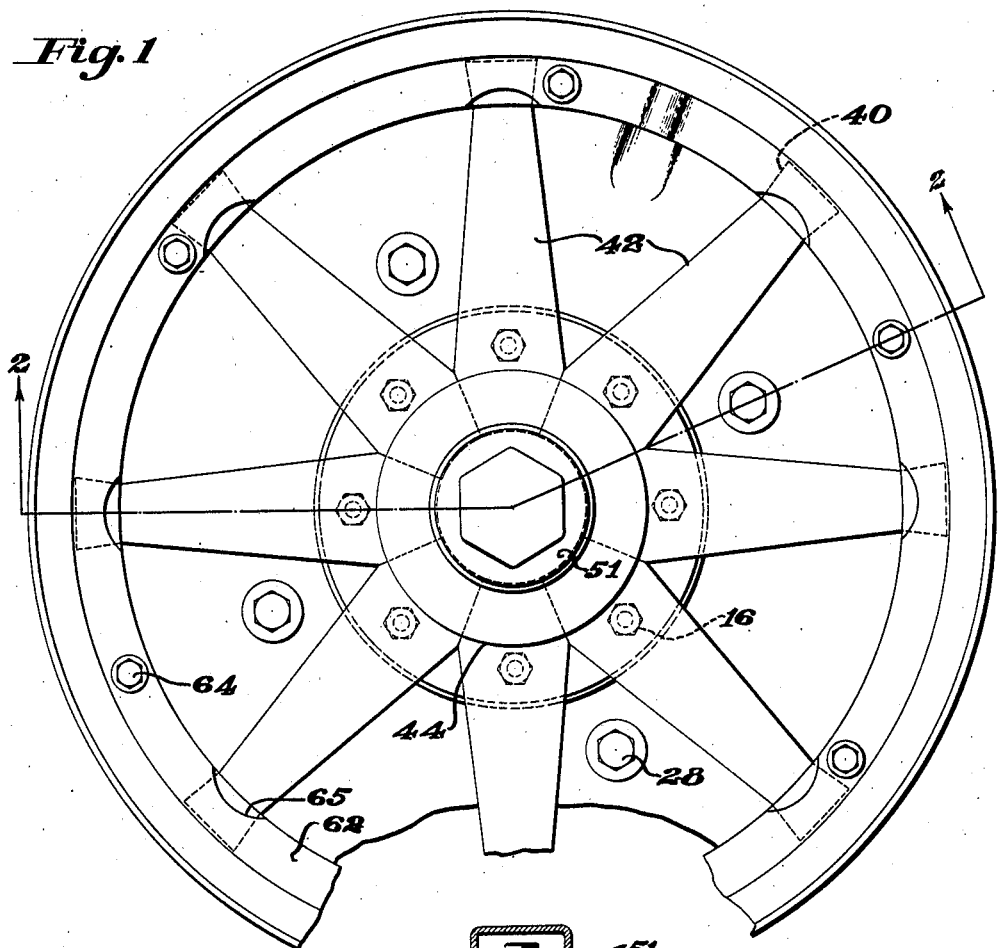
Figure 2:
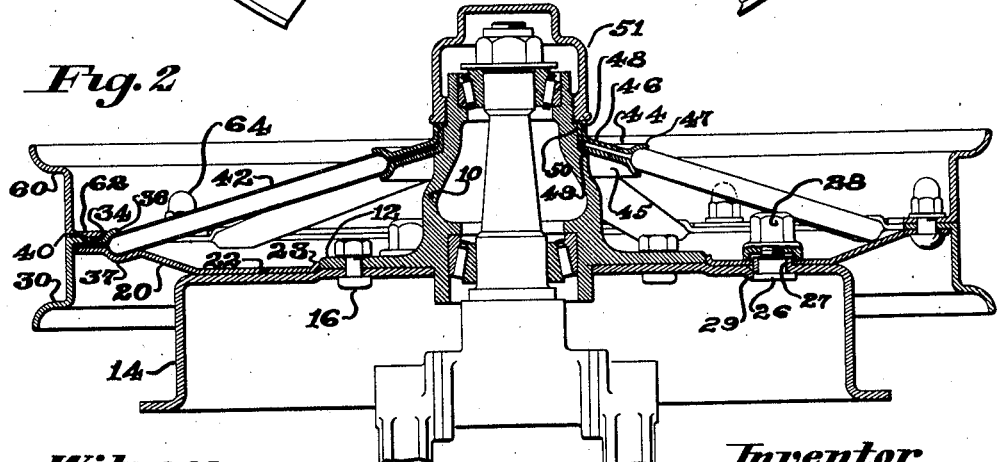

In the accompanying drawing illustrating the preferred form of my invention, Fig. 1 represents a partial plan view of my improved wheel, and Fig. 2 is a section of the wheel shown in Fig. 1.

Referring to the drawing, the axle mount or hub is indicated at 10 in the form of an elongated hub sleeve having an integral, radial flange 12 formed thereon adjacent the inner end. This radial flange is adapted for attachment to a brake drum 14, which is permanently secured to the flange either through rivets 16, or welded areas, or both. The brake drum, after attachment, forms a permanent part of the axle mount or hub, and serves to aid in supporting the detachable portion of the wheel.

The wheel assembly proper comprises a generally radial flange or disk 20 having an inner portion 22 provided with a centrally disposed opening encompassed by a laterally turned periphery 23 to form a seat for the disk on the periphery of the flange 12. With this construction the live load is transmitted from the disk directly to the hub flange, or vice versa. The portion 22 of the disk contacts with and abuts against the face of the brake drum, and is rigidly and detachably connected therewith for driving purposes through securing lugs 26, which seat in short tubular necks 27 formed in the drum, the disk being provided with openings of slightly larger diameter to receive these necks. Each securing lug is prevented from turning by a tongue 29, projected from the surface of the brake drum as indicated. The lugs are threaded for the reception of cap nuts 28, which engage the disk and lock it to the drum as indicated.

The outer portion of the disk 20 is permanently secured to a rim section 30, which comprises generally one-half the rim 32, terminating in an inwardly extending, radial flange 34. The disk and the inwardly extending flange 34 are provided with complementary pockets 36 and 37, which provide recesses when the parts are assembled for the reception of flattened spoke ends 40, formed upon tubular spokes 42, as generally described in my application Serial No. 230,477, filed November 2, 1927. The spoke and the adjacent portions of the disk and rim flange are rigidly secured in assembled relation by welded areas passing through the disk flange and interposed spoke end. From the connection with the rim section at the outer end, the several spokes, as indicated, project inwardly and toward the outside of the wheel, the spokes being of sufficient width to abut one another on their inner or hub ends, as shown more particularly in Fig. 1. The hub ends of the spoke are connected and rigidly maintained in assembled relation by cooperating circumferential flanges 44 and 45, each flange consisting of a straight portion 46 for engagement with the flattened ends of the spokes, and an out-turned portion 47 for receiving the thickened or tubular portions of the spokes. The inner spoke ends and connecting circumferential flanges are permanently joined through welded areas, at least some of which pass through the flanges and spoke ends. The inner ends of the flanges are turned laterally at 48 to properly engage with a substantially cylindrical seat 50, provided at the outer portion of the axle mounting. The flanges are rigidly maintained in contact with a shoulder 49 on the axle mounting by a holding member 51, threaded to the end of the axle mounting, and also serving as a cap when desired. It will be evident that the above described construction provides a spoke assembly which is united at its outer periphery to the circumferential flange of the rim section and also to the complementary disk. Obviously it is a matter of indifference from this point of view whether the spoke assembly consists of entirely independent spokes separately formed and united, or a spoke assembly produced in any other suitable manner.

With this construction it will be evident that when mounted the wheel assembly is seated at the outer end of the mounting, and the flange on the inner end of the mounting, and is connected for driving purposes to the brake drum through the disk 20 and connecting lugs.

The rim of the wheel is completed by a separable rim section 60, provided with an inwardly extending flange 62, which is adapted to abut and be supported against the flange 34. The flange 62 is provided with cut-away portions 65, which center the flange with respect to protuberances formed on the flange 34 for the reception of the outer tubular portions of the spokes. These cut-away portions seat upon the protuberances and relieve the usual securing bolts 64 of shearing strains. By removing the securing bolts from the accompanying rim section, the tire may be readily demounted from the remaining rim section.

With this construction it will be understood that the rim section 32, which comprises substantially one-half of the usual rim permanently connected and forming a part of the wheel assembly through the medium of the spokes and connecting disk, provides adequate strength for the complete wheel assembly. With this construction it is not necessary that the complementary rim section shall give additional strength to the wheel assembly for carrying the load of the vehicle, but that it shall have merely sufficient strength to avoid distortion under the pressure of the inflated tire and the thrusts encountered in use.

In actual practice the tire may be demounted without removing the wheel by merely detaching the separable rim section, or, as more commonly practiced, a spare tire is inflated upon the wheel assembly and replacement of the tire is conveniently accomplished by quickly replacing the wheel assembly. Thereafter, with the wheel assembly demounted, the deflated tire may be readily removed by separating the rim section. It will be evident that with this construction an extremely simple and practical method of removing and replacing the tire from the rim is provided, without sacrificing the strength of the wheel assembly or adding substantially to the weight of the rim.

What is claimed is:

1. A metallic vehicle wheel comprising a rim, a disk, a series of spokes, means for permanently connecting the disk, outer spoke ends and rim in assembled relation, circumferential flanges connecting the inner ends of the spokes which abut one another, the flanges having flattened portions laterally turned in the same direction for properly encompassing the spoke ends and providing a circular supporting collar, an axle mounting, and means for connecting the assembly to the axle mounting.

2. A metallic vehicle wheel comprising two complementary rim sections having tire supporting flanges, one rim section having an inwardly extending radial flange, a hub, means extending between the hub and said flange for rigidly supporting the rim with respect to the hub, the flange having a laterally extending inner edge portion to receive the supporting means, the other rim section having a flange abutting the flange of the first section and engaging the laterally extended portion thereof, and means for securing the flanges together.

ARTHUR M. STANLEY.